United States Patent
Logan et al.

(10) Patent No.: US 9,332,424 B2
(45) Date of Patent: May 3, 2016

(54) CENTRALLY MANAGED SOLUTION FOR ALL DEVICE MANAGEMENT ACTIVITIES

(75) Inventors: Will K. Logan, Overland Park, KS (US); Bindu Rama Rao, Laguna Niguel, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 860 days.

(21) Appl. No.: 11/500,734

(22) Filed: Aug. 7, 2006

(65) Prior Publication Data

US 2007/0169093 A1 Jul. 19, 2007

Related U.S. Application Data

(60) Provisional application No. 60/705,858, filed on Aug. 5, 2005.

(51) Int. Cl.
| | |
|---|---|
| *H04M 3/00* | (2006.01) |
| *H04W 8/24* | (2009.01) |
| *G06F 9/445* | (2006.01) |
| *H04W 12/08* | (2009.01) |
| *H04W 36/04* | (2009.01) |
| *H04W 88/18* | (2009.01) |

(52) U.S. Cl.
CPC .............. *H04W 8/245* (2013.01); *G06F 8/60* (2013.01); *G06F 8/665* (2013.01); *G06F 9/44505* (2013.01); *H04W 12/08* (2013.01); *H04W 36/04* (2013.01); *H04W 88/18* (2013.01)

(58) Field of Classification Search
CPC ..... H04W 8/245; H04W 4/001; H04W 88/02; H04W 12/08; H04W 36/04; H04W 8/22; H04W 4/16; H04W 76/02; H04W 80/045; H04L 69/329; H04L 41/0879; H04L 41/5054; H04L 41/082; H04L 63/0876; H04L 67/28; G06F 8/65; H04M 1/72525
USPC .............. 455/419, 418, 550.1, 420, 557, 517, 455/410, 414.1; 717/173, 172, 168, 178, 717/170, 171, 174, 176; 709/224, 220, 203, 709/221, 223, 204
See application file for complete search history.

(56) References Cited

U.S. PATENT DOCUMENTS

| | | | |
|---|---|---|---|
| 6,349,205 B1 * | 2/2002 | Fang et al. .................... | 455/419 |
| 6,456,843 B1 * | 9/2002 | Daly ............................. | 455/419 |

(Continued)

FOREIGN PATENT DOCUMENTS

WO WO-0241147 A1 5/2002

OTHER PUBLICATIONS

Itaba "PCT/JP2004/007178" (Abstract only).*

*Primary Examiner* — Fred Casca
(74) *Attorney, Agent, or Firm* — Kilpatrick Townsend & Stockton LLP

(57) ABSTRACT

A centrally managed solution for all device management activities. This includes a set of device and subscriber registries, which are being constantly updated as new terminals, and subscribers are added to the system. It also includes support for legacy CDMA specific device management standards such as OTASP and OTAPA and support for remote handset configuration via SMS, using the latest standards from the Open Mobile Alliance Client Provisioning. In one embodiment, it includes support for remote handset configuration over IP, using the latest Open Mobile Alliance Client Provisioning and IOTA device management standards.

12 Claims, 6 Drawing Sheets

(56) References Cited

U.S. PATENT DOCUMENTS

| | | |
|---|---|---|
| 7,543,118 B1 | 6/2009 | Chen et al. |
| 2003/0167273 A1* | 9/2003 | Alexander et al. ............ 707/100 |
| 2004/0018831 A1* | 1/2004 | Majmundar et al. .......... 455/419 |
| 2004/0092255 A1* | 5/2004 | Ji et al. ......................... 455/419 |
| 2004/0098421 A1* | 5/2004 | Peng ............................. 707/203 |
| 2005/0039178 A1* | 2/2005 | Marolia et al. ................. 717/168 |
| 2005/0172141 A1* | 8/2005 | Gayde et al. ................... 713/191 |
| 2007/0014243 A1* | 1/2007 | Meyer et al. ................... 370/249 |

* cited by examiner

CENTRALLY MANAGED SOLUTION FOR ALL DEVICE MANAGEMENT ACTIVITIES

RELATED APPLICATIONS

The present application makes reference to, claims priority to, and claims benefit of U.S. Provisional Patent Application Ser. No. 60/705,858, entitled "CENTRALLY MANAGED SOLUTION FOR ALL DEVICE MANAGEMENT ACTIVITIES" filed Aug. 05, 2005, the complete subject matter of which is hereby incorporated herein by reference, in its entirety.

The present application makes reference to PCT Application with publication number WO/02/41147A1, PCT number PCT/US01/44034, filed Nov. 19, 2001, and to U.S. Provisional Patent Application Ser. No. 60/249,606, filed Nov. 17, 2000, the complete subject matter of each of which is hereby incorporated herein by reference, in its entirety.

The present application also makes reference to U.S. Pat. Ser. No. 11/125,974, titled 'MULTIPLE VARIANCE PLATFORM FOR THE MANAGEMENT OF MOBILE DEVICES, filed on May 07, 2005, which is based on a provisional with the same title filed on May 07, 2004, the complete subject matter of each of which is hereby incorporated herein by reference, in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs or to introduce new features, or both.

There is a problem with generating update packages in an efficient mode when at least a portion of the content in a mobile phone image is compressed, or encrypted, or both. There is a problem in minimizing the size of an update package that contains a difference information for a code transition between an old version to a new version.

A common problem in the differential compression of executable files is the pointer mismatch due to code relocation. When a block of code is moved from a memory region to another, all pointers to that region will change accordingly. If in the old version a pointer points to an address A and in the new version of the same code, the same pointer points to B, it is likely that other pointers to A will be changed in the new version into pointers to B. Incorporating such issues into a solution is not easy. In addition, automating the generation of update packages when code changes dramatically between an old version and a newer version is still an art form and prone to errors, and therefore needs tweaking.

Sometimes, mobile handsets need to be provisioned before they can be used in a network. This requires a provisioning protocol, provisioning servers, etc. However, if there are many different types of devices being used in the network, multiple provisioning servers may have to be used, employing multiple protocols, and multiple servers. This comes with associated management problems.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A device, system and/or method supporting roaming sensitivity for device management operations on electronic devices, substantially as shown in and/or described in connection with at least one of the figures, as set forth more completely in the claims.

These and other advantages and novel features of the present invention, as well as details of an illustrated embodiment thereof will be more fully understood from the following description and drawings.

DETAILED DESCRIPTION OF THE INVENTION

Aspects of the present invention relate to the configuration, management and updating of configuration parameters, firmware and/or software in a mobile electronic device. More specifically, aspects of the present invention relate to incorporating device management in a network, for example initiating firmware updates if a mobile electronic device is determined to be capable of firmware updates. Although the present application refers frequently to an electronic device in terms of a cellular phone, a pager, a personal digital assistant, or a personal computer, this does not represent a specific limitation of the present invention. A mobile electronic device for the purposes of the present application may comprise a wide variety of electronic devices having updatable code and/or configuration parameters that may be managed via a wired or wireless communications link using a device client resident in the electronic device. Although the following makes reference to the Open Mobile Alliance (OMA) protocols and specifications, representative embodiments the present invention may be applied in combination with other industry standard protocols.

Figure 1:
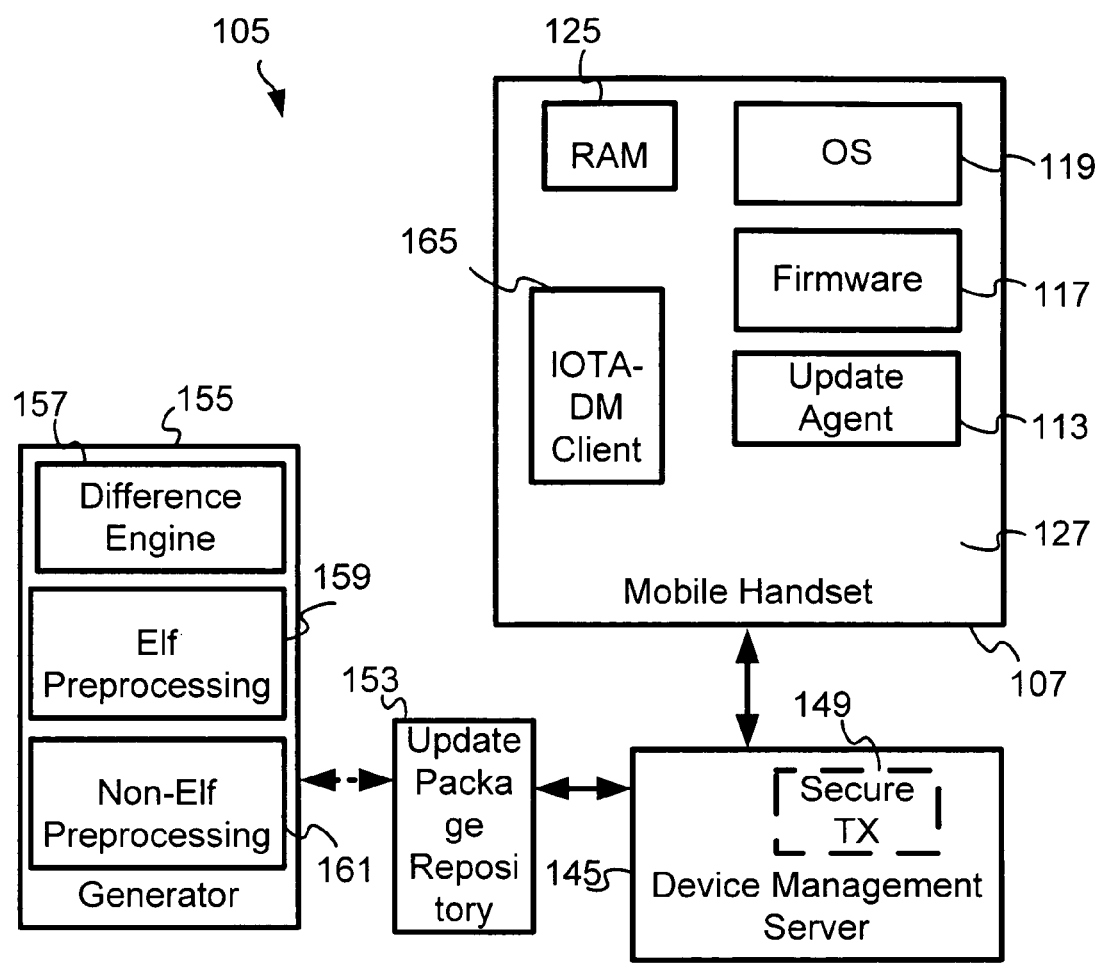
FIG. 1 is a perspective diagram of a mobile handset network that employs a generator to generate update packages and an update agent in a mobile device that is capable of updating firmware and software in mobile device using the update packages.

FIG. 1 is a perspective diagram of a mobile handset network 105 that employs a generator 155 to generate update packages and an update agent 113 in a mobile device 107 that is capable of updating firmware 117 and software 119 in the mobile device 107 using the update packages. The mobile handset network 105 comprises the generator 155 capable of generating update packages that are employed to update firmware 117/software 119 in mobile handsets 107, an update package repository 153 that acts as a repository of update packages, a device management (DM) server 145 that dispenses update packages and the mobile handset 107 that retrieves update packages from the device management server 145 to update its firmware 117/software 119.

The device management server 145 supports tunneling of provisioning information and protocols over the primary communication/management protocol between the mobile device 107 and the device management server 145. For example, in one embodiment, it facilitates tunneling of IS685 or OMA Client Provisioning information (messages) over an OMA-DM protocol.

The present invention provides for a centrally managed solution for all device management activities. This includes a set of device and subscriber registries, which are being constantly updated as new terminals, and subscribers are added to the system. It also includes support for legacy CDMA specific device management standards such as over-the air service provisioning (OTASP) and over-the air parameter administration (OTAPA1) and support for remote handset configuration via short message service (SMS) using the latest standards from the Open Mobile Alliance (OMA) Client Provisioning (CP). In one embodiment, it includes support for remote handset configuration over Internet Protocol (IP), using the latest Open Mobile Alliance Client Provisioning and Internet over-the-air (IOTA) device management standards.

In general, the update agent 113 is resident in an embedded device, such as a mobile handset 107 (cell phones). The update agent 113 is implemented in hardware in one related embodiment, and in software in another related embodiment, and is employed to use an update package to update firmware 117 and/or software 119 resident in non-volatile memory of the mobile handset 107, such as a NAND based flash memory or a NOR based flash memory. The update process has to be fault tolerant in the mobile device. Typically, a fault tolerant update agent is employed for such update or firmware or software in the mobile handset 107.

The generator 155 comprises a differencing engine 157 that is used to conducting a differencing algorithm to generate a difference information between one version of a firmware or code and another, a elf preprocessing module 159 that is used to pre-process ELF based firmware or code, and a non-elf preprocessing module 161 that is used to pre-process a non-ELF based firmware or code. That is because the mobile handsets comprise of code, such as firmware and OS, that could be ELF-based or NON-ELF based. For example, the mobile handset 107 may comprise of a firmware that is ELF-based or NON-Elf based.

As the functionality of mobile devices 107 grows at an increasing rate, configuring OS 119 and firmware 117, etc. and maintaining the services and features on the mobile devices 107 becomes a complex and time-consuming task. Phone Manufacturers and Mobile Operators should ensure that phone configuration is quick and easy for the end-user. Advanced mobile services require accurate mobile phone settings. Mobile Device Management supported by the network 105 helps the widespread adoption of mobile services, as it provides a mechanism for the users to easily subscribe to new services. For the mobile operators this enables a fast and easy way to introduce new services and manage provisioned services, by dynamically adjusting to changes and ensuring a certain level of quality of service.

Figure 2:
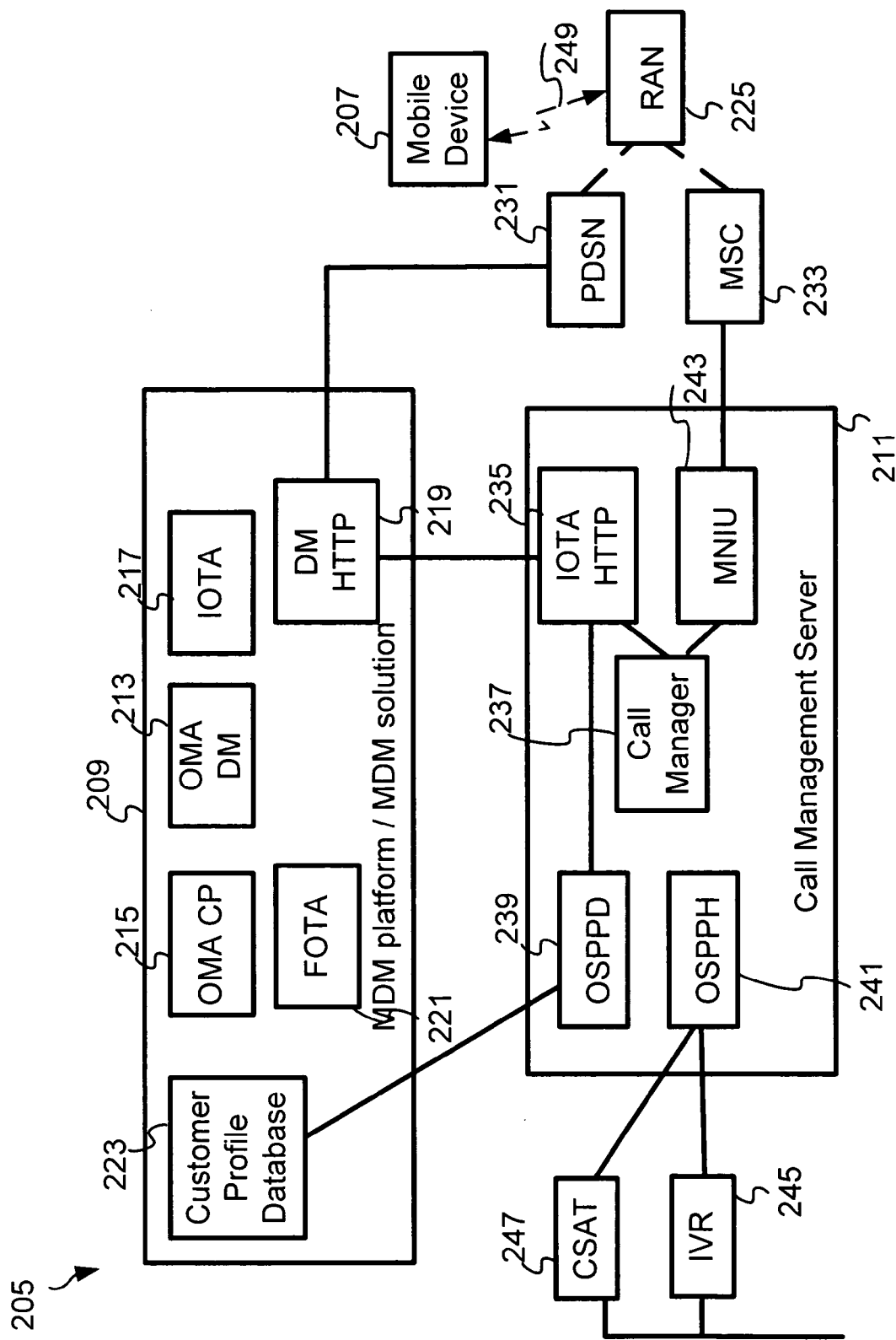
FIG. 2 is a perspective block diagram of a mobile device management (MDM) solution in a network.

FIG. 2 is a perspective block diagram of a mobile device management (MDM) 209 solution in a network 205. To ensure that the operator of the network 205 can control the cost burden of device management, the mobile device management solution has the following advanced features:

A centrally managed solution for all device management activities. This includes a set of device and subscriber registries, which are being constantly updated as new terminals, and subscribers are added to the system.

Support for legacy CDMA specific device management standards such as OTASP and OTAPA.

Support for remote handset configuration via SMS, using the latest standards from the Open Mobile Alliance Client Provisioning.

Support for remote handset configuration over IP, using the latest Open Mobile Alliance Client Provisioning and IOTA device management standards.

Support for Remote Firmware Upgrade, allowing re-flash of terminals over-the-air.

Support for download of IS-683C parameter blocks over IP.

Integration into the operator's POS, Billing and Customer Care Infrastructure.

The MDM solution 209 (also referred to as the MDM platform) comprises an OMA compliant device management server, called OMA DM server 145, which is integrated with the other platforms as necessary providing a centrally managed solution for all device management activities.

In one embodiment, the network 205 is a CDMA operator's network that uses OTASP and OTAPA (IS-725/IS-683) device management to improve end-user experience and at the same time contain the operational costs of customer care. Using the IS 683C standard, operators can seamlessly enter service parameters onto their new 3G subscribers' handsets for both voice and data services. By streamlining these tasks, an operator realizes a cost effective and efficient way to migrate the operator's subscriber base to the next generation network. Improved customer care and ease of use with data services will ultimately result in increased revenues for operators. End users want their service maintenance to be as automated as possible and the availability of silent yet reliable provisioning is an important element in overall customer satisfaction.

In one embodiment, the existing provisioning platform is the incumbent OTAF platform within the network 205 and the existing provisioning platform requires upgrading to new services and new mobile devices 207. This network 205 is upgraded to support IP based OTA (IOTA 217) for OTAPA and OTASP tunnelling. The Mobile Device Platform (MDP) platform 209 comprising the device management server 213 provides the functionality for all IP based communication with the terminal as well as configuration, service activation and firmware upgrades. The upgraded provisioning platform in the network 205 uses the "customer profile" database 223 of the MDM platform 209 (such as the Bitfone MVP DM server) as the central repository for all IS 683C parameter settings for example MDN, IMSI, Analog/CDMA NAM, PRL ID and 3G NAI etc.

In one embodiment, the network 205 is a EV-DO network and the operator of the network 205 requires a Mobile Device Management (MDM) solution 209 specifically for their evolving 3G (EV-DO) network. The MDM solution that incorporates the OMA device management server 213 in the network 205 has the following features:

Support for IS-683-D/IS-725-A provisioning.
Open Mobile Alliance Client Provisioning OMA-CP 215
Open Mobile Alliance Device Management OMA-DM.
CDMA Development Group, IP based Over-The-Air support 217 for OTAPA and OTASP tunnelling.
CDMA Development Group, IP based Over-The-Air support for firmware over-the-air (FOTA) 217
Integration to the Operator's OSS/BSS framework.
Automatic Device Identification based on MEID (IS-683-D).

The MDM solution 219 in the network 205 provides a centrally managed solution for all device management activities. The MDM incorporates an automatically populated set of device and subscriber registries. This provides for configuration and firmware upgrade without manual intervention.

The MDM platform 209 provides a graphical user interfaces to allow for the following:

Operation and Maintenance
Device Administration
Firmware Management
Customer Care Provisioning
Self Service Provisioning These interfaces can be integrated with an Operator's customer care and POS systems, if necessary.

The MDM platform 209 also provides an interface to the EV-DO packet data network that forms part of the network 205 using hypertext transfer protocol (HTTP) as a bearer protocol. Depending on the device type the MDM platform uses either the OMA DM protocol or the CDMA Development Group (CDG) IOTA protocol to perform device management activities. These include:

Initial Activation.
Firmware Upgrade.
Continuous Provisioning.

The MDM platform 209 also provides an interface to a circuit switched network portion of the network 105 using the following bearer protocols.

IS-637A
IS-725A
IS-683C

In one embodiment, the MDM solution 209 in the network 105 stores the "configuration profile" for all provisioned subscribers, the profile includes such items as:

Mobile identification Number (MIN).
MDN.
Electronic Serial Number (ESN)/MEID.
Make and Model information.
Number Assignment Module (NA) Settings.
Preferred Roaming List (PRL) ID's.
3GPD Access Parameters.
PUZL ID's.

An IOTA/HTTP interface 235 is used to exchange IOTA MMC documents containing embedded IS-683C requests.

The OSPP Triggering interface is used to "drive" the Call Management server 211 interface during OTAPA sessions e.g. submit a new PRL to the phone. The OSPP Triggering is employed as needed.

In one embodiment, a SMPP v3.4 interface is used by the MDM platform 209 (ESME TX/Rx) for OMA provisioning e.g. WAP Boot Strapping, WAP Push Service Load.

A Customer Services Activation Terminal (CSAT) 247 is a java based user interface utility allowing activation representatives to activate and reprogram CDMA phones via the call management server 211 platform. An OSPP Handler Process (OSPPH) is provided whose responsibilities are to:

manage all CSC connections to the CSC including the TCP/IP connections
validation of CSC systems
multiplex multiple calls on a single TCAP/IP connection
handle the encoding and decoding of the OSPP protocol data units The call management server 211 comprises a call manager 237 that manages the call manager process, and is the engine of the OTAP. Its primary functions are to:

control the message flow for an OTASP data call
receive OSPP messages from the OSPP Handler process and pass the all relevant data to the MNIU process
receive data from the MNIU process and pass this data to the OSPP handler
maintain the TRN to MSC translation information
generate audit detail records for each call
maintain the list of activation MINs and allocate them per call
allocate call references The call management server 211 also provides Mobile Network Interface Unit (MNIU) 243. The mobile network interface unit 243 is the process that interfaces directly with the mobile network elements using the SS7 protocol. Its primary functions are:

encoding of IS-725 PDUs
delivery and. receipt of the required IS-725 PDUs

The call management server 211 also comprises a Over-the-Air Service Provisioning Protocol Driver (OSPPD) 239. It provides the automaton that controls OTAPA and OTASP sessions. The OSPPD 239 is an "automated CSC agent" controlling the OTAPA and OTASP sessions and performing the same tasks as the activation representatives who activate and reprogram phones through the manual CSAT interface.

The call management server 211 also comprises an IOTA HTTP server 235, which is a specialized server, building and distributing Mobile Management Command (MMC) XML documents using HTTP methods. The IOTA HTTP server 235 replaces the MNIU for the exchange of IS-683 messages i.e. OTAPA/OTASP tunnelling.

The "Customer Profile" Database 223 is the central repository for all customer settings, this includes the MIN, MDN, ESN/MEID, NAM settings and the SSPR Table Number, 3GPD Access Parameters, PUZL settings.

An IOTA component 217 handles connectivity to CMDA devices that use the IOTA standard for device management. A FOTA component 221 is used to manage the firmware download either via the OMA 213 or IOTA 217 protocols to the terminal. This includes a firmware repository which contains the delta packages and the associated metadata. Firmware management is provided by a lifecycle and revision handling GUI.

The OMA DM 213 and the OMA CP 215 components handle the OMA Device Management implementation and is used to connect to the handset in a secure and reliable way. This is implemented compliant to OMA v1.1.2 (or higher) protocol and all options are implemented. The OMA CP component 215 handles client provisioning on the mobile device 207 according to the OMA Client Provisioning standards and is used to provision such elements as the BREW universal resource locator (URL).

The MDM solution 209 supports OTASP IS-725A/IS-683C Provisioning. Existing/legacy provisioning solutions in the network 205 (if available) is used to provision the NAM and PRL parameter blocks in the mobile device 207 using IS-725A/IS-683C based provisioning mechanisms. In addition, it is also possible to provision the 3GPD or PUZL parameter blocks in the mobile device 207. In the case of automatic "one button" activation, the initial activation or OTASP will be supported through existing/legacy IS 725A/IS-683C provisioning (SS7 only). In a related embodiment, there is no support for MEID over IS 725A/IS 683C.

OTAPA tunnelling through IOTA HTTP server 235 is supported. The call management server 211 provisions the mobile device's IS-683C PRL using HTTP based IOTA 235. As IOTA will also be provided for FOTA device management the IOTA activity will be coordinated through the MDM platform 209.

In general, data provisioning using OMA and CDG standards is supported. Data provisioning is handled by the MDM platform 209, which employs either the OMA Client provisioning, OMA Device Management or CDG IP based Over the Air provisioning, depending on the capabilities of the terminal.

Initial data provisioning is triggered from a number of different trigger points.

Via customer care screen
Via point of sale
Via the terminal

Firmware Upgrade is supported in the network 205. The MDM platform 209 will handle firmware upgrade according to the following standards:

OMA DM
CDG IOTA

The firmware upgrade feature is fully integrated with the provisioning mechanisms such that if the capabilities of the mobile device 207 are increased, the MDM platform 209 provisions any new services that are added. In representative embodiments of the present invention, the firmware upgrade feature may be fully integrated with remote handset configuration mechanisms enabling the mobile device management platform to conduct a firmware upgrade to add a capability and simultaneously provision the new capability.

In general, a feature called Automatic Device Identification is supported by the MDM platform 209. Due to the introduction of the MEID within CDMA networks, this allows for the automatic configuration of mobile devices 207 as the MEID can uniquely identify the mobile devices 207. If the mobile device 207 only supports the ESN, the system will use a Model identifier in the IOTA session, or the make and model from the OMA DM session.

As MEID support will not be generally available for some time in the market, for sessions that are server initiated and aimed towards ESN based mobile device 207, it is possible to determine if that mobile device 207 supports IOTA prior to the pushing of a request for a session. The MDM platform 209 supports a mechanism whereby IOTA support can be determined from the ESN for a particular manufacturer by using a pre-agreed number series. If this is not agreed the make and model is stored in the customer profile database 223 prior to pushing a request for a session.

Figure 3:
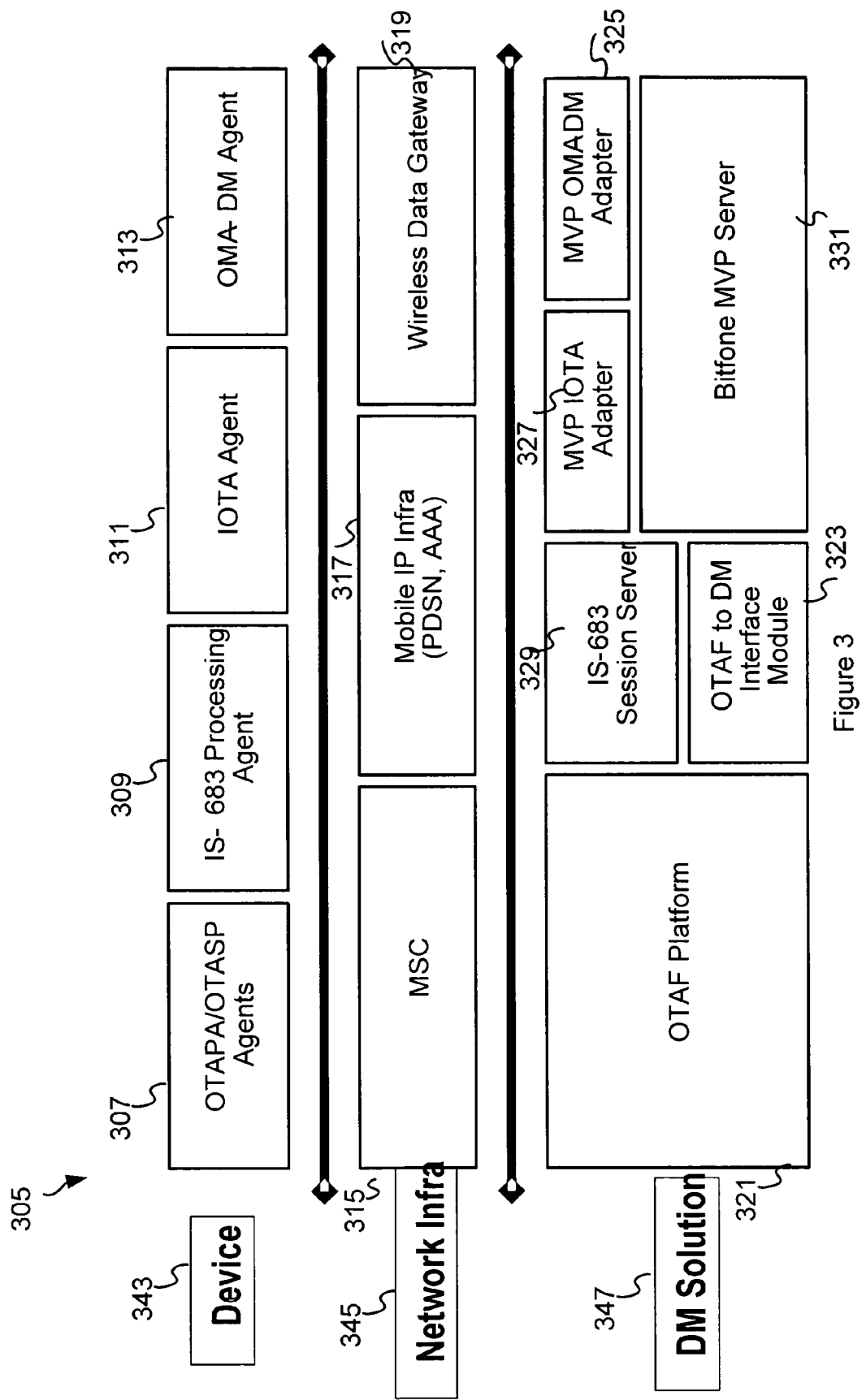
FIG. 3 is a perspective block diagram showing the end-to-end architecture of a network that spans a device, a network infrastructure and the mobile device management solution (MDM) solution.

FIG. 3 is a perspective block diagram showing the end-to-end architecture 305 of a network that spans a device 343, a network infrastructure 345 and the mobile device management solution (MDM) solution 347. The device 343 comprises an OMA-DM agent 313 (capable of implementing the client side of an OMA DM protocol), an IOTA agent 311, an IS-683 processing agent 309 and an OTAPA/OTASP agents 307.

The network infrastructure comprises typical network elements such as an MSC 315, a mobile IP infrastructure 317 and a wireless data gateway 319.

The MDM solution 321 comprises a Bitfone MVP server that facilitates OMA_DM compliant bootstrap provisioning, continuous provisioning, firmware updates, etc. It also comprises an MVP OMA-DM adapter 325 to support different types of devices 343, an MVP IOTA adapter 327 to support IOTA based provisioning of legacy devices 343, an OTAF platform 321, an OTAF to DM interface module 323 and an IS-683 session server 329.

Figure 4:
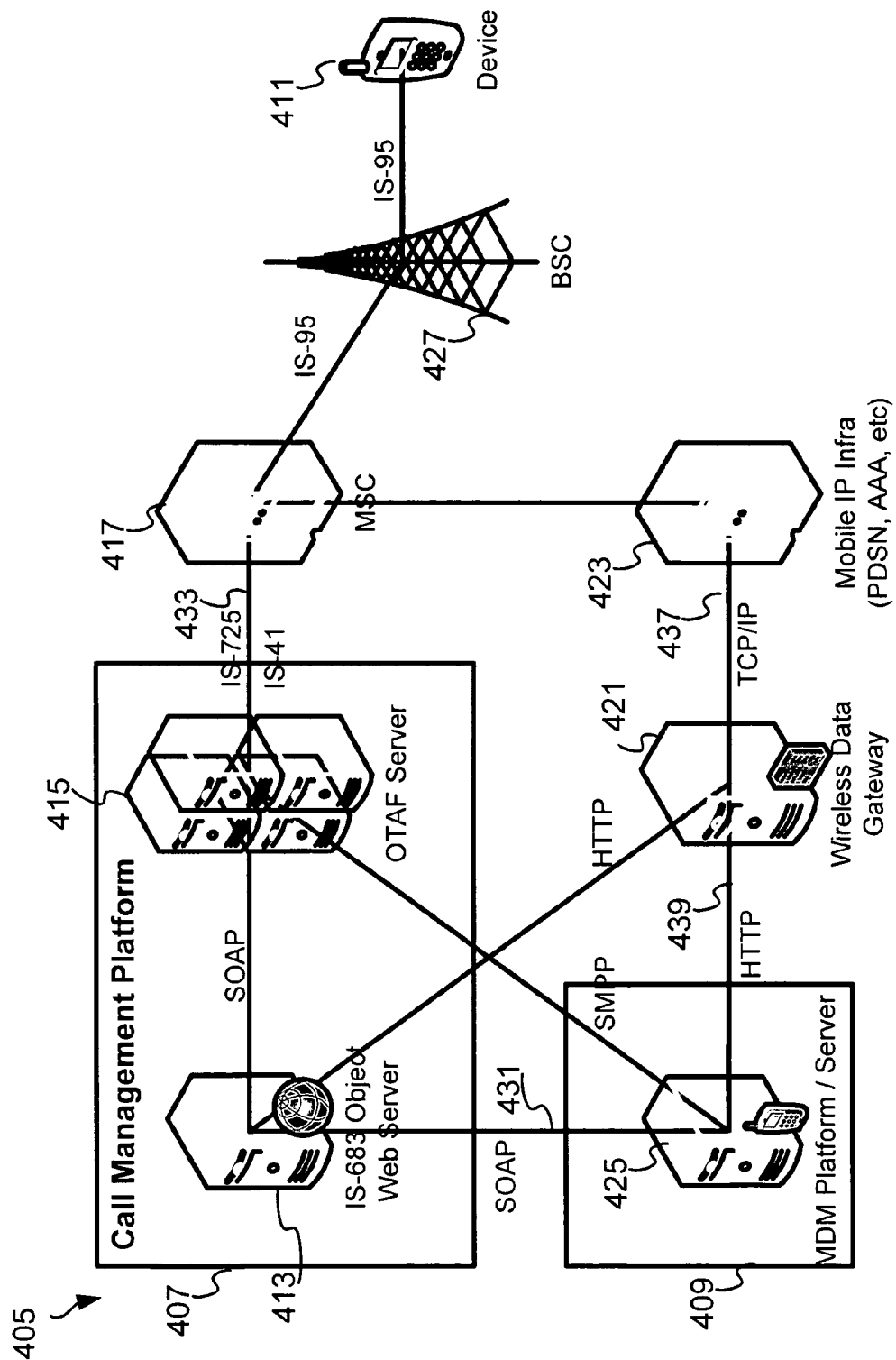
FIG. 4 is a perspective block diagram of a wireless network wherein a call management platform and an MDM platform/server cooperate to provide device management support in order to manage mobile devices such as the mobile device.

FIG. 4 is a perspective block diagram of a wireless network wherein a call management platform 407 and an MDM platform/server 409 cooperate to provide device management support in order to manage mobile devices such as the mobile device 411. The MDM platform/server 409 interacts with the OTAF server 415 and the IS-683 object web server 413 to provision and update the mobile device 411. Interactions between and with these servers 413, 415 is over a SOAP protocol, or over web services in general.

Figure 5:
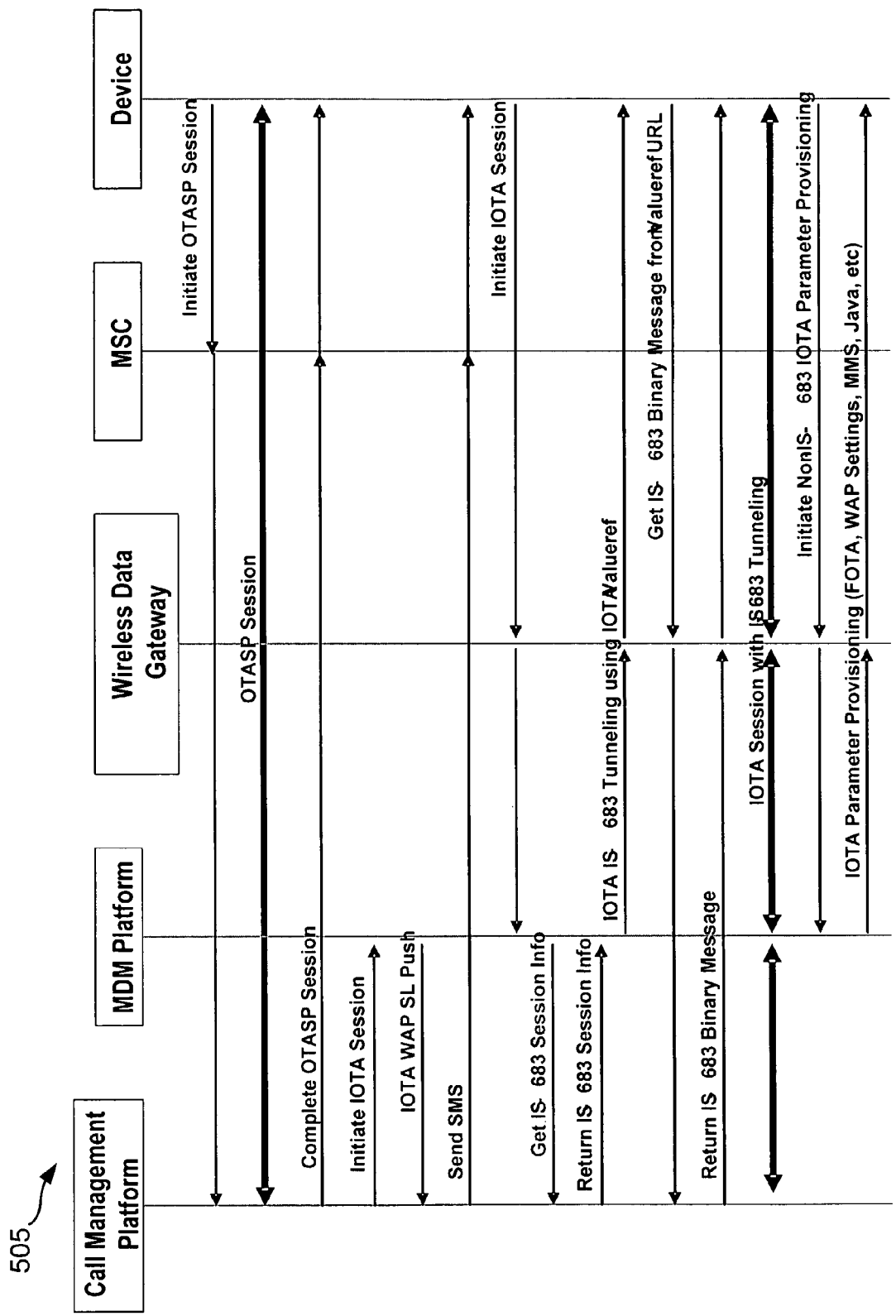
FIG. 5 is an interaction diagram showing end-to-end interactions between various elements in a network where a device is managed by an mobile device management server (MVP).

FIG. 5 is an interaction diagram showing end-to-end interactions 505 between various elements in a network where a device is managed by an mobile device management server (MVP). An MSC participates in the initiation of an OTASP session by the device initially. In particular, the device interacts with a call management platform in an OTASP session, which is followed by an IOTA session between the mobile device management server and the device, the IOTA session involving the tunneling of IS-683 messages to the device. Finally, parameter provisioning over IOTA is conducted between the mobile device management server and the device.

Figure 6:
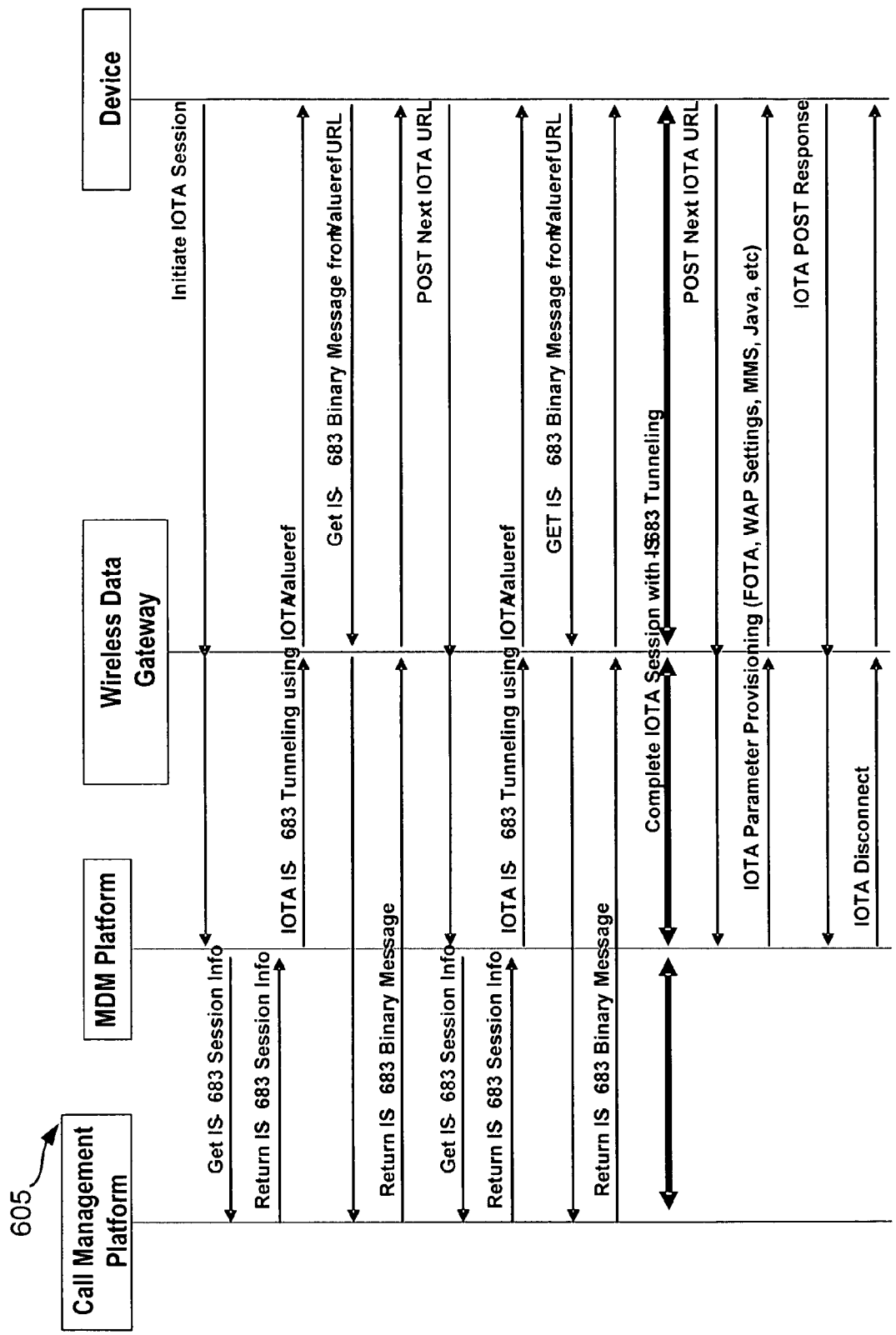
FIG. 6 is an interaction diagram showing end-to-end interactions between various elements in a network where a device is managed by an mobile device management server (MVP).

FIG. 6 is an interaction diagram showing end-to-end interactions 605 between various elements in a network where a device is managed by an mobile device management server (MVP). A wireless data gateway participates in the initiation of an IOTA session by the device initially. In particular, the device interacts with the MDM platform, instead of interacting directly with a call management platform, to receive IS-683 related data and commands. However, the MDM platform establishes an IS-683 session with the call management platform while tunneling the IS-683 data and commands to the device over an IOTA session. Thus, an IOTA session between the mobile device management server and the device makes it possible to tunnel IS-683 data to the device Finally, parameter provisioning over IOTA is conducted between the mobile device management server and the device.

A typical handset configuration process in the network 205, wherein a user activates a button on the device, or a customer care representative activates a button on a provisioning website, is as follows:

Mobile device 207 powered on
Default VLR in MSC 233 is ordered
Default button pressed
Provisioning client initiated and establishes 1X data call pointing to MDM 209
MDM acknowledges or refuses connection
Mobile device 207 requests programming information
MDM 209 associated MEID/ESN with customer profile and sends information to mobile device 209
Mobile device 207 reregisters with MSC 233 and receives valid VLR The "customer profile" database 223 (such as the Bitfone MVP "customer profile" database) is pre-loaded with the mobile device's ESN and CDMA settings (NAM and PRL). Using existing OTASP procedures the mobile device's ESN is received via a "TRN Attach" to the serving MSC 233. The TRN is assigned during a circuit switch call to an activation representative.

In one embodiment, the "One Button" activation requires the mobile device 207 to initiate a data call to the PDSN 231, meaning it must be pre-provisioned with packet data access parameters such as a default NAI and password for HRPD access, MobileIP parameters and a default NAM which identifies the home system. The "One Button" activation requires the "provisioning client" to send the ESN in the initial HTTP GET to the bootstrap URL, alternatively, the bootstrap URL could pass a Protocol Capability Request in the GET Response and the phone could provide the ESN in the Protocol Capability Response posted back to the OTAF.

Once the OTAF knows the "Device ID", it queries the BitFone MVP "customer profile" database and the NAM and PRL settings are passed back. The encoded NAM and PRL blocks are passed to the handset via multi-part MMC documents. The exchange of MMC documents follows a sequence of GET/GET RESPONSE, POST/POST RESPONSE until the NAM and PRL blocks are committed and the IOTA session is terminated.

Assuming the "Device ID" is sent in the initial GET to the default bootstrap URL; the following call flow outlines the One Button "Automated IOTA" provisioning.

1. The mobile device 207 establishes a data call and sends a HTTP GET Request to the pre provisioned activation URL in the mobile device 207. The BitFone MVP DM HTTP server 219 acts as a proxy.
2. The IOTA HTTP server 235 informs the OSPP Driver 239 of the HTTP GET to the call back URL and includes the ESN.
3. The OSPP Driver 239 queries the BitFone MVP "Customer Profile" database and checks to see if the handset had been previously activated, if not, the initial activation session is allowed to continue. If the handset had been previously activated an error in returned in the GET Response.
4. The OSPP Driver 239 sends the NAM data settings to the Call Manager 237.
5. The Call Manager 237 sends the NAM block in an "IS-683 Download Request" to the IOTA HTTP Server 235 (or an alternative server).
6. The IOTA HTTP 235 Server sends a GET Response with the embedded "IS-683 Download Request" in an MMC document.
7. The IOTA handset client stores the NAM data and returns an embedded "IS 683 Download Response" message in a HTTP POST to the IOTA HTTP Server.
8. The IOTA HTTP Server extracts the "IS 683 Download Response" and sends it to the Call Manager.
9. The Call Manager 237 signals a successful download of the NAM block to the OSPP Driver 239.
10. The OSPP Driver 239 sends the SSPR table number to the Call Manager 237.
11. The Call Manager 237 retrieves the extended PRL from the SSPR table and sends an "IS 683 SSPR Download Request" message to the IOTA HTTP Server 235.
12. The IOTA HTTP Server 235 sends a POST Response with the embedded "IS 683 SSPR Download Request" in an MMC document.
13. The IOTA handset client in the mobile device 207 stores the PRL data and returns an embedded "IS 683 SSPR Download Response" message in a HTTP POST to the IOTA HTTP Server 235.
14. The IOTA HTTP Server 235 extracts the "IS 683 SSPR Download Response" and sends it to the Call Manager 237.
15. The Call Manager 237 signals a successful download of the PRL block to the OSPP Driver 239.
16. The OSPP Driver 239 sends a commit request to the Call Manager 237.
17. The Call Manager 237 sends an "IS 683 Commit Request" to the IOTA HTTP Server.
18. The IOTA HTTP Server sends a POST Response with the embedded "IS 683 Commit Request" in an MMC document.
19. The IOTA handset client (in the mobile device 207) moves the NAM and PRL data to the appropriate storage area and returns an embedded "IS 683 Commit Response" message in a HTTP POST to the IOTA HTTP Server.
20. The IOTA HTTP Server extracts the "IS 683 Commit Response" and sends it to the Call Manager 237.
21. The Call Manager 237 signals a successful commit to the OSPP Driver 239.
22. The OSPP Driver 239 signals a terminate IOTA session to the IOTA HTTP Server and updates the BitFone MVP database 223 with a flag to indicate the handset was successfully activated.
23. The IOTA HTTP Server 235 sends a POST Response to the handset client in the mobile device 207 with an MMC document containing the terminate IOTA session request.
24. The handset client releases the data call and forces a re-boot of the handset.
25. The handset re-boots and attaches to the network with the new NAM settings.
26. The OSPP Driver 239 signals a successful OTASP IOTA session to the MDM platform 209.

In another embodiment of the present invention, the network 205 is used for handset configuration of the mobile device 207 wherein a '*' code is used to trigger the activities. The following are the steps in the handset configuration process:

The mobile device 207 powered on
Default VLR created/validate VLR
User dials*code, IVR 245 answers, user selects programming/activation option
MDM 209 via the call management server 211 sends protocol capability request message to mobile device 207 based on TRN that is passed from the MSC 233 (using SS7); ESN passed back
MDM 209 associates MEID/ESN with customer profile
MDM 209 sends to mobile device 207 MDN, MIN, IMSI, SID, etc.
The mobile device 207 reregisters on MSC/HLR with new programming information The IVR 245 may not support "Automated OTASP" sessions. The IVR may then support NPA-Split and Auto-PRL through separate activation star codes. To support this '*' code based handset configuration, the IVR 245 triggers a pre-defined SMPP message to kick-start an "Automated OTASP" session via the OSPP Driver 239. This may require configuration changes at the IVR 245 and MSC 233.

The following call flow outlines the IVR assisted "Automated IOTA" provisioning process:

1. IVR 245 triggers OTAF functions in the call management server 211 to initiate "Automated IOTA" via a pre-defined SMPP message to the OSPP Driver 239.
2. OSPP Driver 239 requests a "TRN Attach" from the Call Manager 237.
3. The Call Manager 237 returns the ESN to the OSPP Driver 239
4. The OSPP Driver 239 queries the BitFone MVP "Customer Profile" database 223 and checks to see if the mobile device 207 had been previously activated, if not, the activation session is allowed to continue. If the handset had been previously activated an error is returned to the IVR 245.
5. The OSPP Driver 239 sends an optional "Welcome Message" to the mobile device 207.

6. The OSPP Driver 239 sends a WAP Push Service Indicator with a call-back URL to initiate the IOTA session.
7. The mobile device 207 establishes a data call and sends a HTTP GET Request to the IOTA HTTP server 235 via the BitFone MVP proxy.
8. The IOTA HTTP server 235 informs the OSPP Driver 239 of the HTTP GET to the call back URL.
9. The OSPP Driver 239 sends the NAM data settings to the Call Manager 237.
10. The Call Manager 237 sends the NAM block in an "IS-683 Download Request" to the IOTA HTTP Server 235.
11. The IOTA HTTP Server 235 sends a GET Response with the embedded "IS-683 Download Request" in an MMC document.
12. The IOTA handset client in the mobile device 207 stores the NAM data and returns an embedded "IS 683 Download Response" message in a HTTP POST to the IOTA HTTP Server.
13. The IOTA HTTP Server 235 extracts the "IS 683 Download Response" and sends it to the Call Manager 237.
14. The Call Manager 237 signals a successful download of the NAM block to the OSPP Driver 239.
15. The OSPP Driver 239 sends the SSPR table number to the Call Manager 237.
16. The Call Manager 237 retrieves the extended PRL from the SSPR table sends an "IS 683 SSPR Download Request" message to the IOTA HTTP Server 235.
17. The IOTA HTTP Server 235 sends a POST Response with the embedded "IS 683 SSPR Download Request" in an MMC document.
18. The IOTA handset client in the mobile device 207 stores the PRL data and returns an embedded "IS 683 SSPR Download Response" message in a HTTP POST to the IOTA HTTP Server 235.
19. The IOTA HTTP Server 235 extracts the "IS 683 Download Response" and sends it to the Call Manager 237.
20. The Call Manager 237 signals a successful download of the PRL block to the OSPP Driver 239.
21. The OSPP Driver 239 sends a commit request to the Call Manager 237.
22. The Call Manager 237 sends an "IS 683 Commit Request" to the IOTA HTTP Server 235.
23. The IOTA HTTP Server 235 sends a POST Response with the embedded "IS 683 Commit Request" in an MMC document.
24. The IOTA handset client in the mobile device 207 moves the NAM and PRL data to the appropriate storage area and returns an embedded "IS 683 Commit Response" message in a HTTP POST to the IOTA HTTP Server 235.
25. The IOTA HTTP Server 235 extracts the "IS 683 Commit Response" and sends it to the Call Manager 237.
26. The Call Manager 237 signals a successful commit to the OSPP Driver 239.
27. The OSPP Driver 239 signals a terminate IOTA session to the IOTA HTTP Server and updates the BitFone MVP database 223 with a flag to indicate the handset was successfully activated.
28. The IOTA HTTP Server 235 sends a POST Response to the handset client with an MMC document containing the terminate IOTA session request.
29. The handset client releases the data call and forces a re-boot of the handset.
30. The handset re-boots and attaches to the network with the new NAM settings.
31. The OSPP Driver 239 signals a successful OTASP IOTA session to the BitFone MVp server (the MDM server 209).

The network 205 also supports handset configuration wherein a setting is changed, such as s BREW URL. The following are the activities involved:

MDM 209 tells the mobile device 207 to attach to the MDM URL-Protocol selected via user profile The mobile device 207 attached to URL/MDM The MDM 209 passes relevant data via OMA-DM 213 or IOTA protocol 217

The MDM administrator triggers a batch "BREW URL Update" via the MVP UI Tool (used for administration), that is part of the MDM platform 209. For each MDN/ESN submitted in the updated batch, the MDM platform 209 checks the device capabilities registry for each subscriber in the "customer profile" database 223. Based on the capabilities of the device, the MDM platform 209 sends either an OMA-DM 213 notification or a WAP push IOTA 217 service load to wake up the device for the update.

The BREW URL update requires that the handsets have the necessary writeable OMA-DM nodes or IOTA objects. The information in the device capabilities registry is augmented to include flags indicating if a device is BREW capable or not.

The following call flow outlines the BREW URL Update procedure:
1. MDM Administrator initiates a batch BREW URL update to a list of devices indicated by ESN/MEIDs.
2. The MDM platform 209 determines the device type for each ESN/MEID from the pre-provisioned customer profile database. Using this information it determines if it's an IOTA or OMA-DM capable device as well as BREW capabilities.
3. The MDM platform 209 sends the appropriate trigger message (OMA-DM notification or IOTA WAP push service load) to the BREW capable devices 207.
4. Device 207 receives the notification, wakes up and establishes a data connection using the Product Release Instructions (PRI) provisioning NAI information.
5. The MDM platform 209 rendezvous with the mobile device 207 and does an IOTA WRITE/COMMIT or an OMA-DM REPLACE to update the BREW URL.
6. Session is disconnected with the MDM platform 209 (the OMA DM server, for example) and the customer profile database 223 is updated to reflect the provisioning event.
7. The next time the mobile device 207 utilizes the BREW agent in the mobile device 207, the updated URL is used to communicate with the BREW infrastructure.

The network 205 also supports a handset configuration wherein a setting is changed, for example, a new PRL is provided. The following is the general procedure for providing a new PRL:

MDM 209 attempts OMA-DM or IOTA push

If step one fails, send PRL via call management server 211 (using SS7/SMPP) and billing files are sent back to MDM 209 to update records The OTAP administrator may trigger an "Automated IOTA PRL Download" via the SMPP-PRL Tool, for example. A new set of OSPP messages for IOTA based sessions shall be defined. The OSPP messages will be based upon the existing OSPP in SMPP standard, however the IOTA sessions will have their own distinct PID. The call management server 211 core uses PID based routing to deliver the new OSPP messages to the OSPP Driver 239.

In the new PRL scenario described above, if the MDM fails to update the new PRL, the fallback is to perform the PRL update via the "legacy platform". This requires the other MDM vendors to support OSPP in SMPP messages. Note the "billing files are sent back to MDM to update records", this requires the other MDM vendors to support a common CDR files, extract all OTAPA messages, remove the PRL ID from the CDR and update the "customer profile" database 223.

The following call flow outlines the Automated IOTA PRL Download procedure.

1. The Call Management server 211 OTAP administrator triggers an "Automated IOTA PRL Download" via a registered SMPP message to the OSPP Driver 239, the PRL ID is contained within the SMPP message.
2. The OSPP Driver 239 updates the "customer profile" database 223 with the Pending PRL ID and the OTAPA Call-Back URL.
3. The OSPP Driver 239 sends a WAP Push Service Load with the OTAPA Call-Back URL to initiate the IOTA session.
4. The call management server 211 kernel stores the WAP Push message and forwards it to the CDMA User module.
5. The CDMA User module builds an IS-637 WAP service message and forwards it to the ANSI Router.
6. The ANSI Router performs an SMSREQ to the subscribers HLR.
7. The subscriber HLR returns the current serving MSC address.
8. The Telepath ANSI Router forwards the SMDPP containing WAP Push Service Load in the SMDPP_BearerData to the Serving MSC 233.
9. The Serving MSC 233 returns a successful smdpp ACK to the ANSI Router.
10. The ANSI Router sends an ACK to the CDMA User module.
11. The CDMA User module sends the ACK to the Call management server 211 kernel.
12. The Call management server 211 kernel sends a RECEIPT message to the OSPP Driver 239.
13. The OSPP Driver 239 extracts the subscribers MDN from the RECEIPT message.
14. The OSPP Driver 239 queries the BitFone MVP database 223 for the pending PRL ID and OTAPA Call Back URL.
15. The OSPP Driver 239 stores the MDN, the OTAPA Call Back URL and pending PRL ID in the Pending OTAPA RAM cache.
16. The mobile device 207 establishes a data call and sends a HTTP GET Request to the OTAPA URL defined in the WAP Push Service Load. The BitFone MVP HTTP server 219 acts as a proxy.
17. The IOTA HTTP server 235 informs the OSPP Driver 239 of the HTTP GET to the OTAPA Call-Back URL.
18. The OSPP Driver 239 sends an OTAPA Request to the Call Manager 237.
19. The Call Manager 237 sends an "IS-683 OTAPA Request" to the IOTA HTTP Server 235.
20. The IOTA HTTP Server 235 sends a GET Response with the embedded "IS-683 OTAPA Request" in an MMC document.
21. The IOTA handset client in the mobile device 207 returns an embedded "IS-683 OTAPA Response" message in a HTTP POST to the IOTA HTTP Server 235.
22. The IOTA HTTP Server 235 extracts the "IS-683 OTAPA Response" and sends it to the Call Manager 237.
23. The Call Manager 237 signals a successful OTAPA Request to the OSPP Driver 239.
24. The OSPP Driver 239 sends the SSPR table number to the Call Manager 237.
25. The Call Manager retrieves the extended PRL from the SSPR table and sends an "IS 683 SSPR Download Request" message to the IOTA HTTP Server 235.
26. The IOTA HTTP Server 235 sends a POST Response with the embedded "IS 683 SSPR Download Request" in an MMC document.
27. The IOTA handset client stores the PRL data and returns an embedded "IS 683 SSPR Download Response" message in a HTTP POST to the IOTA HTTP Server 235.
28. The IOTA HTTP Server extracts the "IS 683 SSPR Download Response" and sends it to the Call Manager 237.
29. The Call Manager 237 signals a successful download of the PRL block to the OSPP Driver 239.
30. The OSPP Driver 239 sends a Commit Request to the Call Manager 237.
31. The Call Manager 237 sends an "IS 683 Commit Request" to the IOTA HTTP Server 235.
32. The IOTA HTTP Server 235 sends a POST Response with the embedded "IS 683 Commit Request" in an MMC document.
33. The IOTA handset client moves the PRL data to the appropriate storage area and returns an embedded "IS 683 Commit Response" message in a HTTP POST to the IOTA HTTP Server 235.
34. The IOTA HTTP Server 235 extracts the "IS 683 Commit Response" and sends it to the Call Manager 237.
35. The Call Manager 237 signals a successful commit to the OSPP Driver 239.
36. The OSPP Driver 239 signals an OTAPA Stop to the Call Manager 237 and updates the BitFone MVP database 223 with the SSPR Table Number of the successfully downloaded PRL.
37. The Call Manager 237 sends the "IS-683 OTAPA Stop Request" to the IOTA HTTP Server.
38. The IOTA HTTP Server 235 sends a POST Response to the handset client with an MMC document containing the "IS-683 OTAPA Stop" request.
39. The IOTA handset client returns an embedded "IS-683 OTAPA Stop Response" message in a HTTP POST to the IOTA HTTP Server 235.
40. The IOTA HTTP Server 235 extracts the "IS-683 OTAPA Stop Response" and sends it to the Call Manager 237.
41. The Call Manager 237 signals a successful OTAPA Stop to the OSPP Driver 239.
42. The OSPP Driver 239 signals a terminate IOTA session to the IOTA HTTP Server 235 and updates the BitFone MVP database 223 with a flag to indicate the handset was successfully activated.
43. The IOTA HTTP Server 235 sends a POST Response to the handset client with an MMC document containing the terminate IOTA session request.
44. The handset client in the mobile device 207 releases the data call.

The present invention also addresses handset configuration changes wherein the ESN of the mobile device 207 is changed. The general procedures are as follows:

New mobile is purchased for an active subscriber
ESN change made in billing
Billing system sends down new ESN to the MDM platform and associates new ESN with customer's profile
Mobile is configured via the normal activation process (i.e. one-button activation on handset or via*code)

In a related embodiment, the network 205 supports a slightly different process for CDF ESN Changes, as presented below:

New mobile is purchased for an active subscriber
ESN change made in billing
Billing system sends down new ESN to the MDM platform and associates new ESN with customer's profile
ESN is held in field "New ESN"
Mobile is configured via the normal activation process (i.e. one-button activation on handset or via*code)
ESN is sent from "New ESN" field to "Activated ESN"

"Activated ESN" is activated on network

This approach is similar to the previous one in terms of the activation process, "one-button or star code"; however there are a number of billing related issues such as integration with a billing system and the implementation of New and Activated ESN state in the mobile device 207 and in the MDM 209.

One important issue that is addressed by the MDM platform 209 is that of purging old data from the customer profile database 223. It is sometimes necessary to keep an archive of old data from old devices, for a configurable period (say 6 months after deactivation) and be automatically purged from the active customer profile database to an off-line data store.

To load information of new customers/subscribers to the network 205, (for active subscribers purchasing new handsets), in one embodiment, an existing customer profile is copied and assigned to the new ESN, the activation flag is also set to "Pending Activation". Following a successful "one-button or star code" activation, the old ESN activation flag is set to "De-activated" and the database record is time stamped for future purging.

The present invention also provides for handset configuration wherein a new feature in the mobile device 207 is activated. The following is the process for such feature activation, with "Mobile Web" used as an exemplary feature to be activated:

Handset attempts to access Mobile Web and is not provisioned for the service.

Handset recognizes error and display on handset "Would you like to activate Mobile Web?".

Yes is pressed and a request is sent to billing via the MDM. Normal feature provisioning occurs.

In general, in order to maintain call-flow and user interface consistency the device provisioning clients in the mobile devices 207 need to implement such activation support in their DM clients or in other agents in the mobile device 207. For example, the DM client will need to detect that the device is not provisioned or mis-provisioned and trigger an provisioning session to a pre-defined WAP-provisioning bootstrap URL. This URL should be represented as either an OMA-DM node or IOTA object and included in the default PRI values pre-provisioned by the OEM.

In general it is important that the error indicating that the device is not activated for a given service (that a user of the mobile device 207 may attempt to use) be clearly defined so as to eliminate unnecessary provisioning attempts which will cause undue load on the system and is also likely to confuse the user.

The following call flow outlines the WAP feature activation provisioning procedure, which employs the 44 steps described above for the New PRL setting scenario, these first 44 steps conducted initially, followed by the additional steps described below:

45. The mobile device 207 launches a web session.
46. An error is returned by the WAP gateway indicating that the device is not provisioned for this service.
47. The mobile device 207 detects this error and prompts the user to activate WAP services
48. The mobile device 207 establishes a data session using the provisioning NAI programmed in the PRI values.
49. The mobile device 207 launches a browser session using the URL defined in the configurable WAP service bootstrap URL.
50. The mobile device 207 rendezvous with the MDM platform 209 at the WAP service bootstrap URL, the ESN of the device is provided as an HTTP header from the WAP gateway proxying the provisioning request.
51. The mobile device 207 is returned an HTML or WML deck informing the user of the billing information related to enabling the service.
52. User clicks the "Continue" button and the browser initiates a GET on the next URL
53. The MDM platform 209 returns the contractual legal information related to enabling the service.
54. User clicks "Agree" in the browser and the browser initiates a GET on the next URL to initiate the provisioning of the service
55. The MDM platform 209 receives legal "Agree" response and logs the timestamp and service information into the customer profile database.
56. The MDM platform 209 communicates with the billing gateway and sends an update to add WAP service to the provisioning profile for the subscriber identified by the ESN.
57. The operator's billing gateway updates its database and sends a provisioning record for that subscriber to the WAP gateway to finalize the service provisioning.
58. The operator's billing gateway sends the provisioning result back to the MDM platform 209 for success or failure. If failure, a code will be indicated.
59. The MDM platform updates its customer profile database with the service provisioning information.
60. The MDM platform server responds back to the waiting device with an HTML or WML document indicating provisioning success or failure and instructions.
61. The mobile device 207 reconnects using its appropriately provisioned WAP NAI and connects to the WAP gateway.
62. The WAP gateway detects that user has been provisioned for the service and the device commencing browsing as normal.

The present invention also provides for handset configuration and feature activation wherein the text messaging feature is not active in the mobile device 207:

Handset attempts to access Text Messaging and is not provisioned for the service.

Handset recognizes error and display on handset "Would you like to activate Text Messaging?".

Yes is pressed and a request is sent to billing via the MDM. Normal feature provisioning occurs.

The present invention also provides for handset configuration and feature activation wherein the picture messaging feature is not active in the mobile device 207:

Handset attempts to access Picture Messaging and is not provisioned for the service.

Handset recognizes error and display on handset "Would you like to activate Picture Messaging?".

Yes is pressed and a request is sent to billing via the MDM. Normal feature provisioning occurs.

The present invention also provides for handset configuration and feature activation wherein the video messaging feature is not active in the mobile device 207:

Handset attempts to access Video Messaging and is not provisioned for the service.

Handset recognizes error and display on handset "Would you like to activate Video Messaging?".

Yes is pressed and a request is sent to billing via the MDM. Normal feature provisioning occurs.

The present invention also provides for handset configuration and feature activation wherein a Touch2Talk feature is not active in the mobile device 207:

Handset attempts to access Touch2Talk and is not provisioned for the service.

Handset recognizes error and display on handset "Would you like to activate Touch2Talk?".

Yes is pressed and a request is sent to billing via the MDM. Normal feature provisioning occurs.

The present invention supports mobile initiated Firmware OTA (FOTA) updates for the mobile device 207. In FOTA update, the DM client (or some other client on the mobile device 207) on mobile device 207 interacts with a customer via appropriate screens, wherein the customer selects a firmware updates (menu warns customer that the mobile device 207 will be reset for conducting firmware update). Mobile initiated firmware update can also occur based on PRI settings for URL in the mobile device 207 and connectivity to MDM platform 209 being available. Mobile initiated firmware update can also occur based on customer profile (ESN and MDN), wherein the MDM platform 209 determines if a firmware update is available for the mobile device 207, and if it is determined to be available, the new firmware package is sent to the mobile device 207 for a firmware update.

A new provisionable URL object is defined for this scenario that is similar to the "bootstrap" URLs defined for mobile device 207 bootstrap. This client initiated FOTA URL is factory provisioned with the PRI values and can be easily modified in the field using IOTA or OMA-DM just like the "bootstrap" URLs.

The following call flow outlines the client-initiated FOTA provisioning procedure:
1. User browses through the mobile device 207 UI and selects "Check for Software Update" menu item.
2. The mobile device 207 establishes a data session using the provisioning NAI programmed in the PRI values.
3. The mobile device 207 launches a provisioning agent session using the URL defined in the configurable client-initiated FOTA URL.
4. The mobile device 207 rendezvous with the MDM platform 209 (specifically the OMA DM server 213) at the client-initiated FOTA URL, the ESN of the device is provided as an HTTP header from the WAP gateway proxying the provisioning request.
5. MDM platform 209 uses the ESN to look up the device capabilities from based on the customer profile database.
6. MDM platform 209 creates either an IOTA 217 or OMA-DM 213 FOTA session in the database.
7. The MDM platform 209 server responds back to the waiting device with HTTP 302 redirect pointing back to a pending FOTA provisioning transaction on either the IOTA or OMA-DM adapter depending on the device capabilities check.
8. The mobile device 207 rendezvous with provisioning URL in the 302 redirect
9. MDM platform 209 returns either an IOTA or OMA-DM MMV (Make-Model-Version) query.
10. The mobile device 207 returns MMV via IOTA or OMA-DM
11. Based on information in MMV, the MDM platform 209 returns an IOTA Write or OMA-DM Replace/Exec for the appropriate firmware update delta package.
12. The mobile device 207 Downloads the firmware update delta package and POSTs the final status of the download back to the MVP
13. The MDM platform 209 finishes IOTA or OMA-DM session with the client and writes the location of the final update status POST URL.
14. Device tears down data session and prompts the user to install the package that has been downloaded
15. Subscriber clicks "Yes" and the phone displays the update package information and release notes downloaded in the firmware update package descriptor.
16. Subscriber clicks "Yes" to apply the update and the mobile device 207 displays the legal disclaimer stating that the mobile device 207 will be unavailable during the update and unable to make 911 calls.
17. Subscriber clicks "Yes"
18. Device restarts and initiates the firmware update agent with the downloaded update delta package.
19. The mobile device 207 software is updated by the firmware update agent.
20. The mobile device 207 restarts
21. The mobile device 207 re-establishes a 1X data session using the provisioning NAI from the PRI values.
22. The mobile device 207 silently rendezvous with either the IOTA or OMA-DM final status POST URL to report the status of the firmware update.

The present invention also supports network initiated firmware update on the mobile device 207. The operator selects mobile make/model to update, in general, and makes arrangements to have one or all of such devices to be updated. The MDM platform 209 determines which handsets read the selected firmware update, for example. For each customer requiring the firmware update, the MDM platform 209 has mobile device 207 attach to MDM via OMA/DM (or IOTA) via WAP message (back-up via SMS). Once attached the MDM sends firmware to update (notification occurs via a set of SMS messages). Updates can be categorized as mandatory or optional. For mandatory updates, after a certain number of tries the mobile device 207 is automatically updated.

There are many possible ways to establish a list of devices to be targeted for a bulk FOTA update. For example, the MDM platform 207 targets a particular Make/Model/Version for updates or can accommodate a CSV file defining the subscribers to be targeted for update.

A configuration change may be needed in the mobile device 207 after a firmware update, especially when a new feature does not exist in the older firmware version in the mobile device 207 and is being added to the mobile device 207. Thus, the latest firmware version comes with the new feature, and the feature is added as part of the firmware update. In addition, in the billing system may be triggered to support billing after an update.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form. While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of conducting device management of a mobile device, the method comprising:
    receiving a request for an update from the mobile device at a mobile device management platform, the mobile device management platform being a centralized platform separate from the mobile device, the mobile device management platform comprising a customer profile database;
    determining the availability of an update package, for installation on the mobile device, by
        looking up device capability by the mobile device management platform based on an Electronic Serial Number (ESN) or mobile equipment identifier (MEID); and
        preparing for a Firmware Over-the-Air (FOTA) session by registering a pending FOTA session with one of an IP (Internet Protocol) based Over-The-Air (IOTA) component or an Open Mobile Alliance Device Management (OMA-DM) component based on the device capability;
    sending the update package to the mobile device;
    facilitating installation of the update package in response to user permission to install the update package; and
    automatically purging old data corresponding to at least one old device from the customer profile database after a configurable period, the customer profile database serving as a central repository for customer settings.

2. The method of conducting device management from claim 1 wherein receiving the request comprises:
    receiving, from the mobile device, using a client-initiated Firmware Over-the Air (FOTA) URL, device specific information comprising an Electronic Serial Number (ESN) or a mobile equipment identifier (MEID) of the mobile device.

3. The method of conducting device management from claim 1 wherein determining the availability of the update package further comprises:
    responding back to the mobile device with a Hypertext Transfer Protocol (HTTP) redirect referring to the pending FOTA session on either the IOTA component or the OMA-DM component depending on the device capability;
    querying, by the mobile device management platform, for a make, model and version of the mobile device;
    receiving, from by the mobile device, its make, model and version; and
    identifying, by the mobile device management platform, an appropriate firmware update package, based on the make, model and version.

4. The method of conducting device management from claim 1 wherein sending the update package to the mobile device comprises:
    instructing, by the mobile device management platform, the mobile device to employ a specific Universal Resource Locator (URL) for an appropriate firmware update package.

5. The method of conducting device management from claim 1 further comprising:
    causing, the mobile device, to prompt a user to install the update package that has been sent to the mobile device, using an update prompt;
    causing, the mobile device to display update package information and release notes sent with the update package;
    causing the mobile device to show a legal disclaimer stating that the mobile device may be unavailable during an update and that the user will be unable to make 911 calls; and
    causing the mobile device to accept a user response to the update prompt.

6. The method of conducting device management from claim 1 wherein the old data is purged to an off-line data store.

7. A mobile device management platform in a network for managing a mobile device, the mobile device management platform communicatively coupled to the mobile device and comprising:
    a centralized device management server; and
    a customer profile database,
    wherein the centralized device management server is configured to receive a request for an update from the mobile device, determine the availability of an update package for installation on the mobile device, send the update package to the mobile device, facilitate installation of the update package in response to user permission to install the update package, and automatically purge old data corresponding to at least one old device from the customer profile database after a configurable period;
    wherein the customer profile database serves as a central repository for customer settings:
    wherein the centralized device management server is configured to determine the availability of the update package by looking up device capability based on an Electronic Serial Number (ESN) or mobile equipment identifier (MEID); and
    wherein the centralized device management server is further configured to determine the availability of the update package by preparing for a Firmware Over-the-Air (FOTA) session by registering pending FOTA session with one of an IP (Internet Protocol) based Over-The-Air (IOTA) component or an Open Mobile Alliance Device Management (OMA-DM) component based on the device capability.

8. The mobile device management platform of claim 7 wherein the centralized device management server is configured to receive the request
    by receiving, from by the mobile device, using a client-initiated Firmware Over-the Air (FOTA) URL, device specific information comprising an Electronic Serial Number (ESN) or a mobile equipment identifier (MEID) of the mobile device.

9. The mobile device management platform of claim 7 wherein the centralized device management server is further configured to determine the availability of the update package by:
    responding back to the mobile device with a Hypertext Transfer Protocol (HTTP) redirect referring to the pending FOTA session on either the IOTA component or the OMA-DM component depending on the device capability;
    querying for a make, model and version of the mobile device;
    receiving, from the mobile device, its make, model and version; and
    identifying an appropriate firmware update package, based on the make, model and version.

10. The mobile device management platform of claim 7 wherein the centralized device management server is further configured to send the update package to the mobile device by instructing the mobile device to employ a specific Universal Resource Locator (URL) for an appropriate firmware update package.

11. The mobile device management platform of claim 7 wherein the old data is purged to an off-line data store.

12. The method of claim 1, wherein the at least one old device is a deactivated device.

* * * * *